(12) United States Patent
Li et al.

(10) Patent No.: US 8,370,064 B1
(45) Date of Patent: Feb. 5, 2013

(54) INTEGRATED GLOBAL NAVIGATION SATELLITE SYSTEM AND INERTIAL NAVIGATION SYSTEM FOR NAVIGATION AND TRACKING

(75) Inventors: Rongsheng Li, Hacienda Heights, CA (US); Kamran Ghassemi, Orange, CA (US)

(73) Assignee: The Boeing Company, Chicago, IL (US)

( * ) Notice: Subject to any disclaimer, the term of this patent is extended or adjusted under 35 U.S.C. 154(b) by 342 days.

(21) Appl. No.: 12/760,221

(22) Filed: Apr. 14, 2010

(51) Int. Cl.
*G01C 21/00* (2006.01)

(52) U.S. Cl. ........ 701/479; 701/480; 701/501; 701/509; 701/510

(58) Field of Classification Search .................. 701/468, 701/469, 473, 474, 479, 480, 501, 509, 510
See application file for complete search history.

(56) References Cited

U.S. PATENT DOCUMENTS

| | | | |
|---|---|---|---|
| 5,452,869 A | 9/1995 | Basuthakur et al. | |
| 6,278,945 B1 * | 8/2001 | Lin | 701/472 |
| 6,285,927 B1 | 9/2001 | Li et al. | |
| 6,330,988 B1 | 12/2001 | Liu et al. | |
| 6,331,835 B1 * | 12/2001 | Gustafson et al. | 342/357.59 |
| 6,456,371 B1 | 9/2002 | Peck | |
| 6,501,419 B2 | 12/2002 | Davis et al. | |
| 6,516,021 B1 * | 2/2003 | Abbott et al. | 375/150 |
| 6,691,033 B1 | 2/2004 | Li et al. | |
| 6,697,736 B2 * | 2/2004 | Lin | 701/472 |
| 6,859,170 B2 * | 2/2005 | Devereux et al. | 342/357.29 |
| 7,274,504 B2 * | 9/2007 | Crane et al. | 342/357.65 |
| 7,397,422 B2 | 7/2008 | Tekawy et al. | |
| 7,410,130 B2 | 8/2008 | Wang et al. | |
| 7,415,354 B2 * | 8/2008 | Alexander | 701/474 |
| 7,487,016 B2 | 2/2009 | Fowell et al. | |
| 7,546,983 B2 | 6/2009 | Wang et al. | |
| 7,668,629 B2 | 2/2010 | DiEsposti et al. | |
| 7,916,070 B2 * | 3/2011 | Alexander | 342/357.3 |
| 8,027,413 B2 * | 9/2011 | Lillo et al. | 375/343 |
| 8,134,499 B2 * | 3/2012 | Wang et al. | 342/357.3 |
| 2005/0133670 A1 | 6/2005 | Wang et al. | |
| 2009/0012662 A1 | 1/2009 | Liu et al. | |

* cited by examiner

*Primary Examiner* — Joseph C Rodriguez
(74) *Attorney, Agent, or Firm* — Charles L. Moore; Moore & Van Allen PLLC

(57) ABSTRACT

A system for navigation and tracking may include an inertial navigation system adapted to generate a replica GNSS signal and a global navigation satellite system. The global navigation satellite system may include a module to digitize a GNSS signal received from a constellation of global navigation satellites. A correlator receives the digitized GNSS signal and the replica GNSS signal. The correlator correlates the digitized GNSS signal to the replica GNSS signal to generate a correlated GNSS signal. A coherent integration module coherently integrates the correlated GNSS signal to generate an integrated signal having a predetermined rate. A filter receives the integrated signal and generates a data signal for navigation and tracking. An output device may present the navigation and tracking information based on the data signal, or the navigation and tracking information may be used to provide guidance for a vehicle or may be used to track a target.

21 Claims, 2 Drawing Sheets

INTEGRATED GLOBAL NAVIGATION SATELLITE SYSTEM AND INERTIAL NAVIGATION SYSTEM FOR NAVIGATION AND TRACKING

FIELD

The present disclosure relates to global positioning and navigation systems, and more particularly to a system including an integrated global navigation satellite system and inertial navigation system for navigation and tracking.

BACKGROUND

Conventional ultra-tightly coupled (UTC) global navigation satellite system (GNSS) and inertial navigation systems (INS) that perform integrated tracking and navigation require a higher order Kalman Filter running at a high rate or frequency, such as for example a rate of about 50 Hz.

BRIEF SUMMARY

In accordance with an embodiment, a system, method and computer program product for performing integrated navigation and tracking provides near-maximum anti-jamming capability for integrated GNSS/inertial navigation systems with very low demand on computer throughput. The system, method and computer program product integrates the I and Q signals or signal components of a received GNSS signal and replica GNSS signal generated by an INS to a predetermined low rate or frequency and samples these integrated signals at the predetermined low rate or frequency. The predetermined rate or frequency is a function of inertial measuring unit (IMU) or INS and GNSS receiver clock performance. The predetermined low rate may be typically in the range of about 0.1 Hz to about 1.0 Hz compared to a rate of about 50 Hz for conventional systems. The rate is the frequency at which the algorithm performing the integration is run.

In accordance with an embodiment, a system for navigation and tracking may include an inertial navigation system adapted to generate a replica GNSS signal and a global navigation satellite system. The global navigation satellite system may include a module to digitize a GNSS signal received from a constellation of global navigation satellites. A correlator receives the digitized GNSS signal and the replica GNSS signal. The correlator correlates the digitized GNSS signal to the replica GNSS signal to generate a correlated GNSS signal. A coherent integration module coherently integrates the correlated GNSS signal to generate an integrated signal having a predetermined rate. A filter receives the integrated signal and generates a data signal for navigation and tracking. An output device may present the navigation and tracking information based on the data signal, or the navigation and tracking information may be used to provide guidance for a vehicle or may be used to track a target or signal.

In accordance with another embodiment, a method for navigation and tracking may include generating a replica GNSS signal and receiving a GNSS signal from a constellation of global navigation satellites. The method may also include digitizing the received GNSS signal. The replica GNSS signal and the digitized received GNSS signal may be correlated to generate a correlated GNSS signal. The correlated GNSS signal may be coherently integrated to generate an integrated signal having a predetermined rate. Data for navigation and tracking may be generated from the integrated signal. The data for navigation and tracking may be presented to a user or used for guiding a vehicle or tracking a target or signal.

In accordance with another embodiment, a computer program product for navigation and tracking may include a computer readable storage medium having computer readable program code embodied therewith. The computer readable program code may include computer readable program code configured to generate a replica GNSS signal and computer readable program code configured to receive a GNSS signal from a constellation of global navigation satellites. The computer readable program code may also include computer readable program code configured to digitize the received GNSS signal. The computer readable program code may additionally include computer readable program code configured to correlate the replica GNSS signal and the digitized received GNSS signal to generate a correlated GNSS signal and may include computer readable program code configured to coherently integrate the correlated GNSS signal to generate an integrated signal having a predetermined rate. The computer readable program code may further include computer readable program code configured to generate data for navigation and tracking from the integrated signal. The computer readable program code may also include computer readable program code configured to perform one of presenting the navigation and tracking data, guiding a vehicle or tracking a target or signal.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE SEVERAL VIEWS OF THE DRAWINGS

The following detailed description of embodiments refers to the accompanying drawings, which illustrate specific embodiments of the disclosure. Other embodiments having different structures and operations do not depart from the scope of the present disclosure.

DETAILED DESCRIPTION

Figure 1:
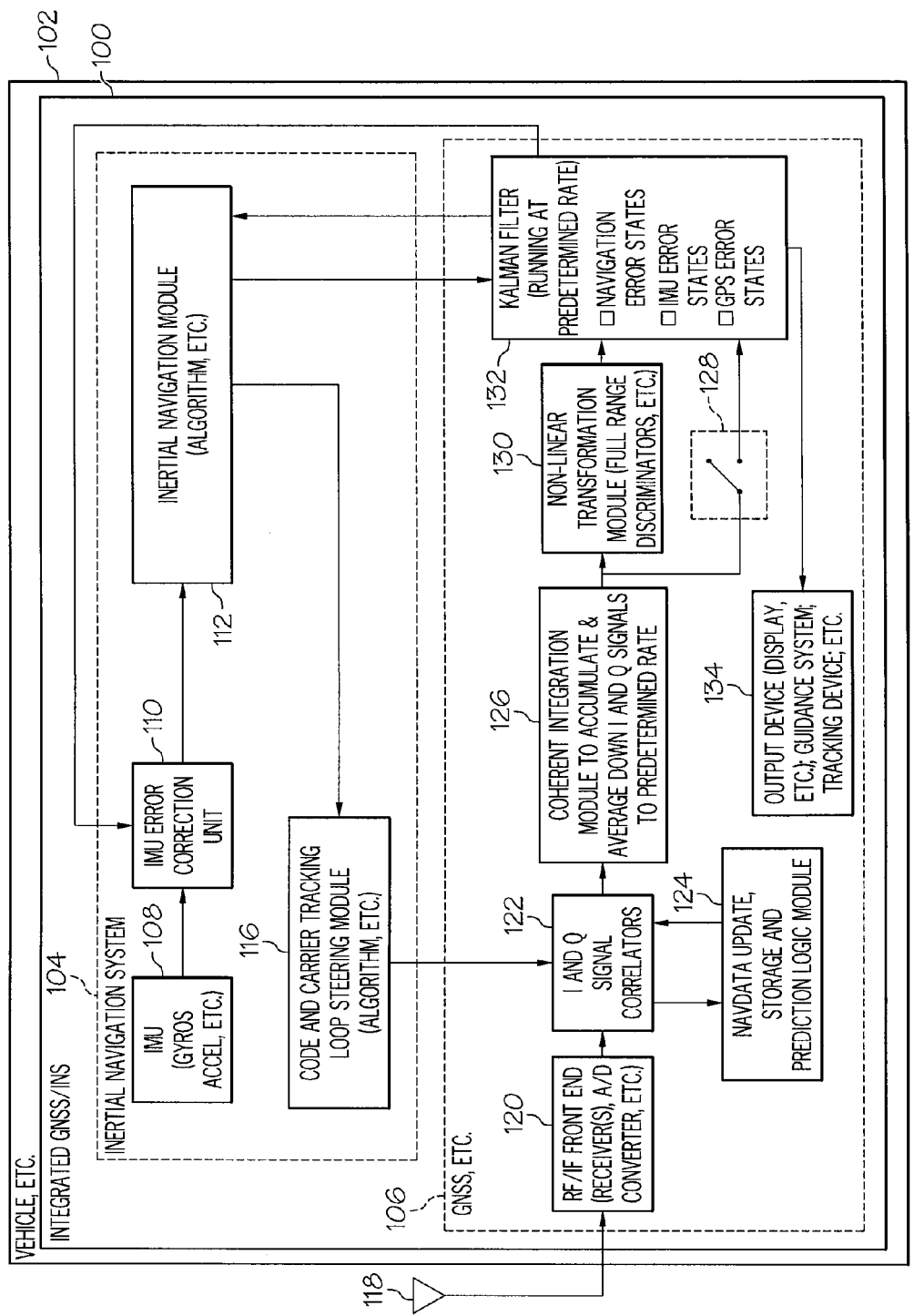
FIG. 1 is a block schematic diagram of an exemplary integrated GNSS system and inertial navigation system for navigation and tracking in accordance with an embodiment of the present disclosure.

The following detailed description of embodiments refers to the accompanying drawings, which illustrate specific embodiments of the disclosure. Other embodiments having different structures and operations do not depart from the scope of the present disclosure.

As will be appreciated by one of skill in the art, features of the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in base band or as part of a carrier wave. Such a propagated signal may take any of a variety of forms, including, but not limited to, electro-magnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block schematic diagram of an exemplary integrated global navigation satellite system (GNSS) and inertial navigation system (INS) 100 for navigation and tracking in accordance with an embodiment of the present disclosure. The integrated GNSS/INS 100 may be associated with a vehicle 102 or mounted in a vehicle 102. The vehicle 102 may be an aerospace vehicle, watercraft, or terrestrial vehicles.

The integrated GNSS/INS 100 may include an INS portion or unit 104 and a GNSS portion or unit 106. The INS unit 104 may include and inertial measurement unit (IMU) 108. The IMU 108 may include a plurality of gyros and accelerometers to sense or measure movement of the vehicle 102. For example, the IMU 108 may include at least three gyros and three accelerometers to sense rotation rate, acceleration, deceleration or other motion of the vehicle 102 about three orthogonal axes which may be defined for the vehicle 102 about which motion of the vehicle 102 may be measured or sensed by the IMU 108. The integrated GNSS/INS 100 may be embodied in a computer, processor or other device.

The INS unit 104 may also include an IMU error correction unit 110. The IMU error correction unit 110 may correct the outputs of the gyros and accelerometers of the IMU 108 using estimated errors, such as bias error, scale factor error, misalignments, or other estimated errors of the gyros and accelerometers.

The INS unit 104 may additionally include and inertial navigation module 112. The inertial navigation module 112 may include a strap-down inertial navigation algorithm or similar program to estimate the position and velocity of the vehicle 102 based on the inertial measurements made by the IMU 108 and corrected by the IMU error correction unit 110. At least one example of an inertial navigation algorithm which may be used in the inertial navigation module 112 is described in *Principles of GNSS, Inertial and Multi-sensor Integrated Navigation System*, by Paul D. Groves, published by Art House in 2008.

The INS unit 104 may also include a code and carrier tracking Loop steering module 116. The code and carrier tracking loop steering module 116 may be adapted to predict at least a GNSS signal pseudo-range, a pseudo-range rate and a carrier phase using the position estimate and the velocity estimate from the inertial navigation module 112 and a time estimate for each of the GNSS satellite. The predicted pseudo-range is computed by computing the distance from the Global Positioning System (GPS) or GNSS satellite to the receiver or front end 120 using the best knowledge of the user or vehicle position produced by the INS unit 104 and corrected by the best estimate of the receiver clock bias as estimated by a Kalman Filter 132, as described in more detail below, plus a estimated ionspheric delay from the Kalman Filter 132. The predicted pseudo range rate is computed by computing the projection of satellite velocity (computed from ephemeris) and the user or vehicle velocity (best knowledge from the INS unit 104) corrected by the best estimate of the clock rate and the estimated ionspheric delay rate from the Kalman Filter 132. The predicted carrier phase is computed from the predicted distance between GPS or GNSS satellite and the user or vehicle 102, plus the estimated clock bias, plus the estimated integer ambiguity as well as estimated ionosphere delays (with an opposite sign compared with pseudo range) from the Kalman Filter 132. The predicted GNSS signal pseudo-range, pseudo-range rate and a carrier phase may be used to control generation of a replica GNSS signal so that the replica GNSS signal substantially matches a signal received by the GNSS unit 106 from the GNSS satellites and which has been digitized by the GNSS unit 106 as described in more detail herein.

The GNSS unit 106 may include a Global Positioning System (GPS), or other type global navigation satellite system, such as Glonass (Global Navigation Satellite System), Galileo, or other GNSS. A signal including navigation data and/or positioning data, which may be referred to herein collectively as NAVDATA, may be received by an antenna 118 from a constellation of global navigation satellites (not shown in FIG. 1 for purposes of clarity). The antenna 118 may be coupled to a radio frequency/intermediate frequency (RF/IF) front end 120. The RF/IF front end 120 may include one or more receivers for receiving NAVDATA signals from one or more different GNSS's. The RF/IF front end 120 may also include an analog to digital (A/D) converter to convert the analog signals into digital signals for further processing by the components of the GNSS unit 106 as described herein.

A correlator 122 may receive the received GNSS signal from the RF/IF front end 120 and may also receive the replica GNSS signal from the code and carrier tracking loop steering module 116 of the INS system 104. The received navigation data bits (NAVDATA) modulated on to the GNSS signal may be demodulated and then sent to a NAVDATA update, storage and prediction logic module 124 for storage when the GNSS is tracked without extended coherent integration (less than about 20 ms) and demodulation is possible. The NAVDATA update, storage and prediction logic module 124 may return the NAVDATA to the correlator 122 when longer than about 20 ms coherent integration is required and the navigation data bits are modulated on to the incoming signal needs to be "wiped off," filtered or removed by some mechanism.

The correlator 122 may include a plurality of I and Q signal correlators. The I and Q signal correlators may correlate the in-phase (I) signal or signal components and quadrature (Q) signal or signal components of the received GNSS signal received by the GNSS unit 106 with the I and Q signals or signal components of the replica GNSS signal received from the steering module 116 of the INS 104.

The GNSS unit 106 may also include a coherent integration module 126 to coherently integrate the correlated GNSS signal from the correlator 122 to generate an integrated signal having a predetermined rate. The coherent integration module 126 may be adapted to accumulate and average each of the I and Q signals to provide integrated signals. The I and Q signals are averaged down or averaged to reduce the rate or frequency of signals to the predetermined rate. The coherent integration module 126 may also sample the integrated signals at the predetermined rate. The predetermined rate may be a function of receiver clock performance of the INS unit 104 and the GNSS unit 106. As described in more detail herein, the predetermined rate permits the Kalman Filter 132 to operate at a substantially reduced rate or frequency corresponding substantially to the predetermined rate, to provide substantially reduced demands on throughput of the Kalman Filter 132. Accordingly, the predetermined rate is desirably a much lower or substantially reduced rate from or frequency compared to the rate at which the Kalman Filter 132 operates in conventional systems which is about 50 Hz as previously described.

A switching unit 128 may be used to alternately directly connect or disconnect the coherent integration module 126 to the Kalman Filter 132. A non-linear transformation module 130 may also receive the integrated signal from the coherent integration module 126. The non-linear transformation module 130 may generate a discriminated signal for code phase error and carrier phase error from the received I and Q signals. The discriminated signal for code phase error and carrier phase error may be transmitted by the non-linear transformation module 130 to the Kalman Filter 132 to generate a data signal for navigation of the vehicle 102 or tracking a target or signal.

The non-linear transformation module 130 may be adapted to generate a measured, averaged pseudo-range error and carrier phase error signal from the integrated signal from the coherent integration module 126. The non-linear transformation module 130 may include one or more full range discriminators to generate the discriminated signal for code phase error and carrier phase error. The full range discriminator for the carrier may provide up to −180 degrees to +180 degrees phase error. The full range discriminator for the code may provide −0.5 chip to +0.5 chip. The non-linear full range discriminators may perform linearization of the pseudo-range error and carrier phase error. The linearization permits the Kalman Filter 132 to operate in a substantially larger dynamic range between about +180 degrees and about −180 degrees of code phase error or carrier phase error during operation. This substantially larger dynamic range provides a substantially maximum anti-jamming capability of the system 100.

The results of the correlations in the coherent integration module 126 are accumulated (or coherently integrated) to generate a lower rate or frequency integrated signal. The integrate signal can be directly used by the Kalman Filter 132 when the switching unit 128 is operated to connect the coherent integration module 126 directly to the Kalman Filter 132. The Kalman Filter 132 is running at the same low rate as the rate the integrated results from the coherent integration module 126 are made available. The lower rate of operation is typically in the range of about 0.1 hertz to about 1.0 Hz which is significantly below the typical operating range of about 50 Hz for Kalman Filters in conventional GNSS systems.

Alternatively the switching unit 128 may be operated to disconnect the direct connection of the coherent integration module 126 to the Kalman Filter 132 and the integrated signal from the coherent integration module 126 will be processed by the non-linear transformation module 130 to produce the discriminated signal for code phase error and carrier phase error to the used as the input to the Kalman Filter running at the predetermined reduced rate.

Accordingly, the Kalman Filter 132 may use either the averaged I and Q signals or may use the output from the non-linear transformation module 130 which contains data for code phase and carrier phase error to generate estimates of position, velocity, attitude or other parameters associated with the vehicle 100. The outputs or estimates from the Kalman Filter may be received by an output device 134. The output device 134 may be a display, guidance system, tracking device or other device for navigation, signal tracking or other purpose. Accordingly, the output device 134 may present navigation or signal tracking information from the Kalman Filter 132, provide guidance or navigation of the vehicle 100, track signals from another vehicle, or perform similar operations.

The Kalman Filter 132 may also be coupled to the inertial navigation module 112. The Kalman Filter 132 may receive position, velocity, and attitude data from the inertial navigation module 112. The Kalman Filter 132 uses these data to form the state transition matrix and the measurement matrices required by the Kalman Filter equations. The Kalman Filter 132 may also provide data to the inertial navigation module 112 to improve the accuracy of the position, velocity, and attitude estimates determined by the inertial navigation module 112. The Kalman Filter 132 may also provide data to the IMU error correction unit 110 to improve the error correction of measurements by the IMU 108.

The Kalman Filter 132 may include at least three position error states, three velocity error states, three attitude error states, about three to about twelve gyro bias/misalignment/scale factor error states, about three to about twelve accelerometer bias/misalignment/scale factor error states, two clock bias/rate error states and 12×3 ambiguity, iono error and iono error rate states. The position error and velocity error states allow the Kalman Filter 132 to estimate the position error and velocity errors of the inertial navigation produced position and velocity estimates. The attitude error states allow the Kalman Filter 132 to estimate the attitude error of the IMU 108. The gyro and accelerometer bias/misalignment/scale factor error states represent the errors associated with the gyro and accelerometers of the IMU 108. The gyro and accelerometer bias/misalignment/scale factor error states allow the Kalman Filter 132 to continuously calibrate the gyro error parameters to achieve better navigation performance. Integer ambiguity states allow the Kalman Filter 132 to estimate the unknown integer number of cycles to make the carrier phase measurement to be equivalent to the code phase measurement, consequently allowing the Kalman Filter 132 to predict the carrier phase when steering the correlators 122. The iono error and iono error rate states represent the errors contained in both the code phase and the carrier phase (with an opposite sign) measurements due to propagation delay caused by the ionosphere when the GNSS signal passes through it. The iono states, and the integer ambiguity states are critical to ensure consistency between the code phase and the carrier phase.

Figure 2:
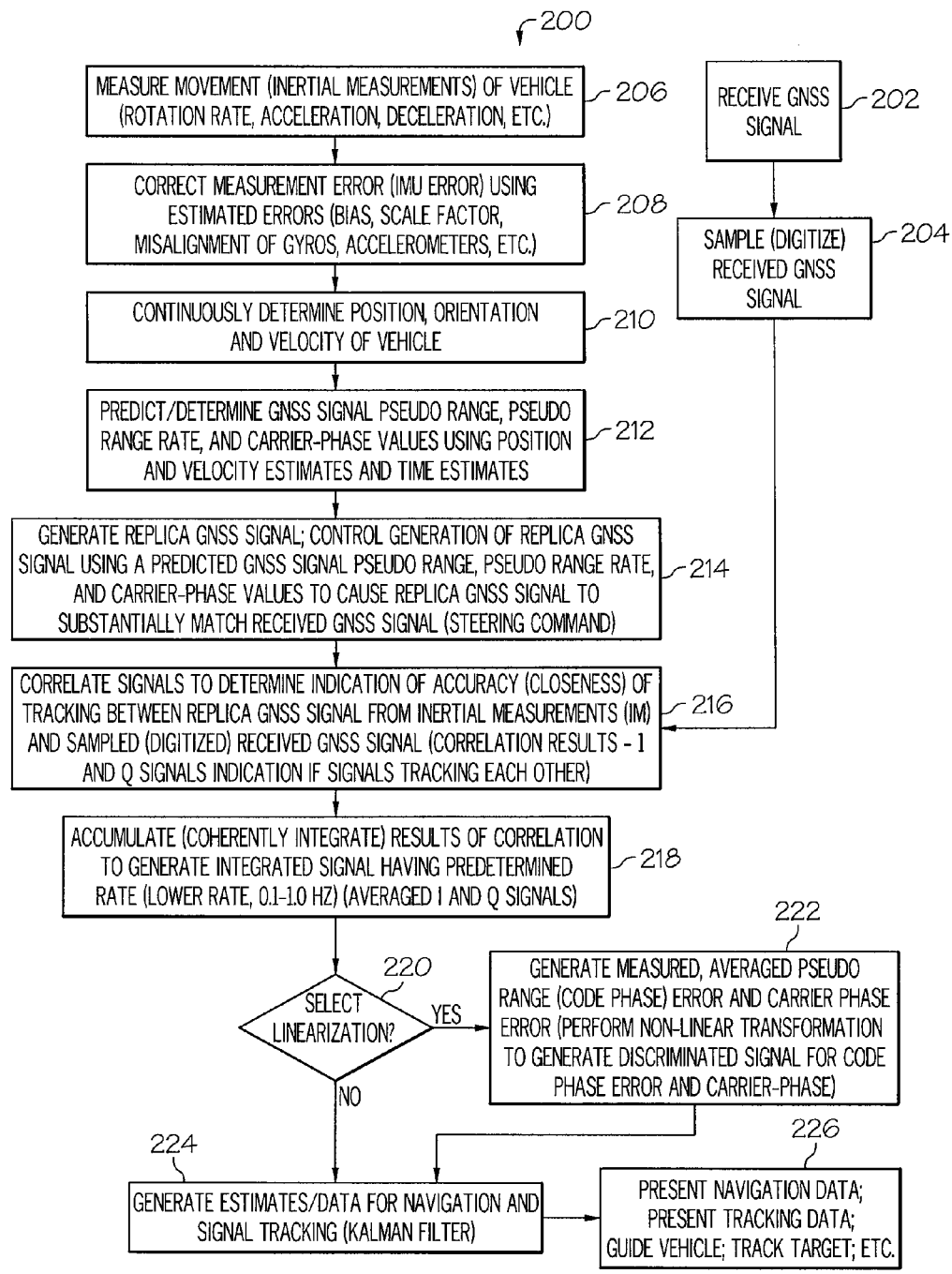
FIG. 2 is a flow chart of an example of a method for navigation and tracking in accordance with an embodiment of the present disclosure.

FIG. 2 is a flow chart of an example of a method 200 for navigation and tracking in accordance with an embodiment of the present disclosure. The method 200 may be embodied in or performed by the system 100 in FIG. 1. In block 202, a GNSS signal or signals may be received from a constellation of global navigation satellites. In block 204, the received GNSS signal or signals may be sampled or digitized.

In block 206, movements or motion of a vehicle may be measured. Examples of movements that may be measured or inertial measurements may include but is not necessarily limited to a rotation rate of the vehicle about an axis defined for the vehicle, acceleration of the vehicle, deceleration of the vehicle or other motion of the vehicle.

In block 208, measurement error in block 206 may be corrected using estimated errors. Examples of estimated errors may include bias errors, scale factor errors, misalignment of gyros, accelerometer errors or other errors associated with measuring or sensing movement of a vehicle or making inertial measurements by an IMU or similar device.

In block 210, the position, orientation and velocity of the vehicle may be continuously determined. In block 212, a GNSS signal pseudo-range, pseudo-range rate, and carrier phase values may be predicted or determined using the position and velocity estimates from block 210 and time estimates.

In block 214, a replica GNSS signal may be generated. Generation of the replica GNSS signal may be controlled using the predicted GNSS pseudo-range, pseudo-rate, and carrier phase values to cause the replica GNSS signal to substantially match the received GNSS signal.

In block 216, the replica GNSS signal from the inertial measurements of the vehicle and the digitized received GNSS signal from block 204 may be correlated to determine an indication of accuracy or closeness of tracking between the replica GNSS signal and the received GNSS signal. The I and Q signals are an indication if the replica GNSS signals are tracking the signals received.

In block 218, results of the correlation in block 216 are accumulated or coherently integrated to generate an integrated signal having a predetermined rate. As previously discussed the predetermined rate is a lower rate or substantially reduced rate than the Kalman Filter normally operates in conventional systems which is about 50 Hz. The lower rate from the coherently integrated signals or accumulated and averaged I and Q signals may be between about 0.1 Hz to about 1.0 Hz.

In block 220, linearization of the accumulated and averaged signals may be selected. If linearization is not selected in block 220, the method 200 may advance to block 224 and the estimates or data for navigation and signal tracking may be generated. The estimates or data for navigation and signal tracking may be generated by a Kalman Filter similar to that previously described or may be generated by a similar device capable of providing accurate date for navigation and signal tracking.

If linearization is selected in block 220 the method 200 may advance to block 222. In block 222, a measured, average pseudo-range (code phase) error and carrier phase error may be generated. In other words, a non-linear transformation may be performed to generate a discriminated signal for code phase error and carrier phase error. The discriminated signal generated in block 222 may be provided to block 224 to generate the estimates or data for navigation and signal tracking.

In block 226, the navigation data or tracking data may be presented, the vehicle may be guided using the navigation and signal tracking data or a target may be tracked.

In accordance with an embodiment, the accumulation of the I and Q signal in block 218 may be performed, not by simple summation, but instead by buffering the navigation data embodied in the I and Q signals. Discrete Fourier transformation (DFT) is performed on the buffered data. A search is performed for the signal with the maximum signal power from the DFT results as the integrated I and Q signal. The corresponding frequency error is used where the maximum signal power is achieved as a measurement to the Kalman Filter 132.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system for navigation and tracking, comprising:
an inertial navigation system adapted to generate a replica GNSS signal;
a global navigation satellite system, wherein the global navigation satellite system comprises:
a module to digitize a GNSS signal received from a constellation of global navigation satellites;
a correlator to receive the digitized received GNSS signal and to receive the replica GNSS signal from the inertial navigation system, wherein the correlator correlates the received GNSS signal to the replica GNSS signal to generate a correlated GNSS signal;
a coherent integration module to coherently integrate the correlated GNSS signal from the correlator to generate an integrated signal having a predetermined rate, wherein the predetermined rate is a function of at least receiver clock performance of the inertial navigation system and the global navigation satellite system;
a filter to receive the integrated signal and to generate a data signal for navigation and tracking; and
an output device to present navigation and tracking information based on the data signal, to provide guidance for a vehicle or to track a target.

2. The system of claim 1, further comprising:
a switching unit to alternately connect and disconnect the coherent integration module to the filter; and
a non-linear transformation module to receive the integrated signal from the coherent integration module and to generate a discriminated signal for code phase error and carrier phase error, wherein the discriminated signal for code phase error and carrier phase error is transmitted to the filter to generate the data signal for navigation and tracking.

3. The system of claim 2, wherein the non-linear transformation module comprises a non-linear full range discriminator to generate the discriminated signal for code phase error and carrier phase error.

4. The system of claim 2, wherein the non-linear transformation module is adapted to generate a measured, averaged pseudo-range error and carrier phase error signal from the integrated signal from the coherent integration module.

5. The system of claim 2, wherein the non-linear transformation module comprises a non-linear full range discriminator to perform linearization of the pseudo-range error and carrier phase error, the linearization permitting the filter to operate in a substantially larger dynamic range between about +180 degrees and about −180 degrees of code phase or carrier phase error during operation, wherein the substantially larger dynamic range provides a substantially maximum anti-jamming capability of the system.

6. The system of claim 1, wherein the correlator receives I and Q signals of the GNSS signal and I and Q signals of the replica GNSS signal, wherein correlated I and Q signal results of the GNSS signal and the replica GNSS signal from the correlator indicate a tracking accuracy between the replica GNSS signal and the received GNSS signal.

7. The system of claim 6, wherein the filter comprises a Kalman Filter, and wherein the coherent integration module accumulates and averages the correlated GNSS signals to permit the Kalman Filter to operate below a rate of about 50 Hz.

8. The system of claim 6, wherein the filter comprises a Kalman Filter, and wherein the coherent integration module accumulates and averages the correlated GNSS signals to permit the Kalman Filter to operate in a range between about 0.1 Hz and about 1.0 Hz.

9. The system of claim 6, wherein the coherent integration module is adapted to accumulate and average each of the I and Q signals to provide integrated signals and to sample the integrated signals at the predetermined rate, wherein the predetermined rate permits the filter to operate at a substantially reduced rate corresponding substantially to the predetermined rate.

10. The system of 1, wherein the inertial navigation system comprises:
an inertial measurement unit to perform measurements of movement of the vehicle associated with the system;

an inertial navigation module to generate at least a position estimate and a velocity estimate of the vehicle from the measurements by the inertial measurement unit; and a code and carrier tracking loop steering module, wherein the code and carrier tracking loop steering module is adapted to predict at least a GNSS signal pseudo-range, a pseudo-range rate and a carrier phase using the position estimate and the velocity estimate from the inertial navigation module, and a time estimate, the GNSS signal pseudo-range, pseudo-range rate and the carrier phase are used to control generation of the of the replica GNSS signal so that the replica GNSS signal substantially matches the received digitized GNSS signal.

11. A method for navigation and tracking, comprising:
generating a replica GNSS signal;
receiving a GNSS signal from a constellation of global navigation satellites;
digitizing the received GNSS signal;
correlating the replica GNSS signal and the digitized received GNSS signal to generate a correlated GNSS signal;
coherently integrating the correlated GNSS signal to generate an integrated signal having a predetermined rate, wherein the predetermined rate is a function of at least receiver clock performance of an inertial navigation system and global navigation satellite system;
generating data for navigation and tracking from the integrated signal; and
performing one of presenting the navigation and tracking data, guiding a vehicle or tracking a target.

12. The method of claim 11, further comprising:
selecting one of: to coherently linearize the integrated signal or to not coherently linearize the integrated signal; and
generating a discriminated signal for code phase error and carrier phase error in response to selecting to coherently linearize the integrated signal.

13. The method of claim 12, further comprising generating a measured, averaged pseudo-range error and carrier phase error signal from the integrated signal in response to selecting to coherently linearize the integrated signal.

14. The method of claim 12, wherein generating the data for navigation and tracking comprises performing a linearization of the pseudo-range error and carrier phase error, the linearization permitting a Kalman Filter to operate in a substantially larger dynamic range between about +180 degrees and about −180 degrees of code phase or carrier phase error during operation, wherein the substantially larger dynamic range provides a substantially maximum anti jamming capability.

15. The method of claim 11, wherein correlating the replica GNSS signal and the digitized received GNSS signal comprises correlating I and Q signals of the digitized received GNSS signal and I and Q signals of the replica GNSS signal, wherein correlated I and Q signal results of the received GNSS signal and the replica GNSS signal indicate a tracking accuracy between the replica GNSS signal and the received GNSS signal.

16. The method of claim 15, wherein, a Kalman Filter generates the data for navigation and tracking from the integrated signal, and wherein coherently integrating the correlated signals comprises accumulating and averaging the correlated GNSS signals to permit the Kalman to operate below a rate of about 50 Hz.

17. The method of claim 15, wherein a Kalman Filter generates the data for navigation and tracking from the integrated signal, and wherein coherently integrating the correlated signals comprises accumulating and averaging the correlated GNSS signals to permit the Kalman to operate in a range between about 0.1 Hz and about 1.0 Hz.

18. The method of claim 15, wherein a Kalman Filter generates the data for navigation and tracking from the integrated signal, and wherein coherently integrating the correlated GNSS signal comprises:
accumulating and averaging each of the I and Q signals to provide integrated signals; and
sampling the integrated signals at the predetermined rate, wherein the predetermined rate permits the Kalman Filter to operate at a substantially reduced rate corresponding substantially to the predetermined rate.

19. The method of claim 11, wherein generating the replica GNSS signal comprises:
sensing movement of the vehicle;
generating at least a position estimate and a velocity estimate of the vehicle from the sensed movement of the vehicle;
predicting at least a GNSS signal pseudo-range, a pseudo-range rate and a carrier phase using the position estimate and the velocity estimate, and a time estimate; and
using the GNSS signal pseudo-range, pseudo-range rate and the carrier phase to control generation of the of the replica GNSS signal so that the replica GNSS signal substantially matches the digitized received GNSS signal.

20. The method of claim 11, further comprising:
accumulating I and Q signals embodying navigation data by buffering the navigation data;
performing a discrete Fourier transformation (DFT) on the buffered navigation data;
searching for a maximum signal power from results of the discrete Fourier transformation, the maximum signal power corresponding to an integrated I and Q signal; and
using a corresponding frequency error where the maximum signal power is achieved as a measurement to the Kalman Filter.

21. A computer program product for navigation and tracking, the computer program product comprising:
a computer readable storage medium having computer readable program code embodied therewith, the computer readable program code comprising:
computer readable program code configured to generate a replica GNSS signal;
computer readable program code configured to receiving a GNSS signal from a constellation of global navigation satellites;
computer readable program code configured to digitize the received GNSS signal;
computer readable program code configured to correlate the replica GNSS signal and the digitized received GNSS signal to generate a correlated GNSS signal;
computer readable program code configured to coherently integrate the correlated GNSS signal to generate an integrated signal having a predetermined rate, wherein the predetermined rate is a function of at least receiver clock performance of an inertial navigation system and global navigation satellite system;
computer readable program code configured to generate data for navigation and tracking from the integrated signal; and
computer readable program code configured to perform one of presenting the navigation and tracking data, guiding a vehicle or tracking a target.

* * * * *